United States Patent [19]
Wada et al.

[11] Patent Number: 5,634,277
[45] Date of Patent: Jun. 3, 1997

[54] CUTTING TOOL

[75] Inventors: Tatsuya Wada; Kouichi Miyamoto, both of Tokyo-to, Japan

[73] Assignee: Ryobi Limited, Tokyo, Japan

[21] Appl. No.: 532,406

[22] Filed: Sep. 22, 1995

[30] Foreign Application Priority Data

Sep. 29, 1994 [JP] Japan .................................. 6-234927

[51] Int. Cl.⁶ .................................................. B27B 19/02
[52] U.S. Cl. ........................... 30/392; 83/699.21; 279/76
[58] Field of Search ........................... 30/392, 393, 394; 279/76; 83/699.21

[56] References Cited

U.S. PATENT DOCUMENTS

| | | | |
|---|---|---|---|
| 2,627,882 | 2/1953 | Kleinsmith | 83/699.21 |
| 3,927,893 | 12/1975 | Dillon et al. | 30/392 |
| 4,106,181 | 8/1978 | Mattchen | 83/699.21 |
| 4,441,255 | 4/1984 | Hoffman | 30/392 |
| 4,528,753 | 7/1985 | Kuhlmann et al. | 30/392 |
| 4,601,477 | 7/1986 | Barrett et al. | 279/76 |
| 5,487,221 | 1/1996 | Oda et al. | 30/392 |

*Primary Examiner*—Hwei-Siu Payer
*Attorney, Agent, or Firm*—Brooks & Kushman P.C.

[57] ABSTRACT

A cutting tool such as jigsaw generally comprises a main body, a plunger provided for the main body to be reciprocally movable in an axial direction thereof, the plunger being provided with an opening and a cutout axially formed to a portion opposing to the opening, a cutting blade to be mounted to the plunger, and a blade mounting mechanism for mounting the blade to the plunger. The blade mounting mechanism comprises a support member inserted into the opening of the plunger and provided with an engaging groove formed along a direction of mounting the blade, a ring member disposed to outer peripheral surfaces of the support member and the plunger, the ring member being formed with a tapered portion at an inner peripheral surface thereof opposing to the cutout of the plunger, and an elastic member for urging the ring member in a direction that a diameter of the tapered portion of the ring member reduces, thereby fastening the blade by the tapered portion of the ring member and the engaging groove of the support member.

17 Claims, 11 Drawing Sheets

5,634,277

CUTTING TOOL

BACKGROUND OF THE INVENTION

The present invention relates to a cutting tool and, more particularly, to a blade mounting (attaching/detaching) mechanism of the cutting tool.

A hand-type cutting tool, so-called a Jigsaw machine has been widely known. In such cutting tool, a blade is mounted firmly by means of a tool such as driver or spanner, which provides a problem of less working performance. In order to eliminate such problem, recently, there is provided a mechanism capable of attaching or detaching the blade by using no tool such as driver or spanner, for example, as disclosed in the Japanese Utility Model Laid-open publication No. HEI 4-79019.

FIG. 11 is a sectional view of a mounting mechanism for attaching or detaching a blade of the above conventional publication. With reference to FIG. 11, reference numeral 101 denotes a plunger which is provided with two windows 101a, 101a. A lever 102 penetrates the windows 101a, 101a and one end of the lever 102 is mounted to the plunger 101 by means of a pin 103 to be rotatable. The lever 102 is provided with a through hole 102a through which a blade is inserted, and a spring 104 is interposed between the lever 102 and the plunger 101 so that the lever 102 is always urged in the clockwise direction with the pin 103 being the center thereof.

In the structure described above, when the blade 105 is mounted, the lever 102 is rotated in the counter-clockwise direction, with the pin 103 being the center thereof, against the urging force of the spring 104 to thereby mount the blade 105, and the lever 102 is then rotated in the clockwise direction by the urging force of the spring 104 so that the blade 105 abuts against one end of the hole 102a, thus being fastened.

According to the conventional structure described above, however, although the blade is fastened without using any tool such as driver or spanner, since the blade and the lever is point contacted, it is difficult to firmly fasten or fix the blade to the lever.

SUMMARY OF THE INVENTION

An object of the present invention is to substantially eliminate defects or drawbacks encountered in the prior art described above and to provide a cutting tool capable of firmly and easily fastening a cutting blade without using specific tool for the fastening.

This and other objects can be achieved according to the present invention by providing a cutting tool comprising:

a main body;

a plunger provided to the main body to be reciprocally movable in its axial direction, the plunger being provided with an opening and a cutout axially formed to a portion opposing to the opening;

a drive means accommodated in the main body for driving the plunger;

a cutting blade to be mounted to the plunger; and a blade mounting mechanism for mounting the blade to the plunger, the blade mounting mechanism comprising a support member inserted into the opening of the plunger and provided with an engaging groove formed along a direction of mounting the blade, a ring member disposed to outer peripheral surfaces of the support member and the plunger, the ring member being formed with a tapered portion at an inner peripheral surface thereof opposing to the cutout of the plunger, and an elastic member for urging the ring member in a direction that a diameter of the tapered portion of the ring member reduces, thereby fastening the blade by the tapered portion of the ring member and the engaging groove of the support member.

In preferred embodiments, the elastic member is held on the outer circumferiential surface of the ring member so as to always urge the ring member downward in an installed condition.

The tapered portion of the ring member has a first tapered section having a predetermined inclination and a second tapered section having an inclination larger than that of the first tapered section for smooth insertion of the blade.

The blade is formed with an engaging protrusion and the support member has a V-shaped groove communicating with the engaging groove of the support member so as to engage with the engaging protrusion of the blade.

The cutting tool may further comprises a blade cover mounted to the main body to be movable, a lever member attached to the main body to be rotatable and engaged with the blade cover to move the blade cover and a claw means formed to the blade cover adapted to contact or separate from the elastic member, wherein when the blade cover is moved through rotation of the lever member, the claw means abuts against the elastic member and the elastic member is then moved against the urging force. The claw means may comprise a plurality of claws.

According to the present invention of the structures described above, when the blade is mounted, the elastic member is moved against the urging force of the elastic member and the ring member is then moved along the axial direction of the plunger. In this operation, the engaging protrusion of the blade is engaged with the engaging groove of the support member, and under the condition, the ring member is moved by the urging force of the elastic member and the blade is then firmly inserted and fastened through the engagement with the tapered portion of the support member.

In the modified embodiment, when the lever member is rotated, the blade cover is moved and the claw member provided for the cover member abuts against the elastic member to move the same against the urging force thereof.

The formation of the V-groove can further firmly fasten the blade.

The nature and further characteristic features of the present invention will be made more clear through the following description with reference to the accompanying drawings.

DESCRIPTION OF PREFERRED THE EMBODIMENTS

A first embodiment of the present invention will be first described hereunder with reference to FIGS. 1 to 6.

Figure 1:
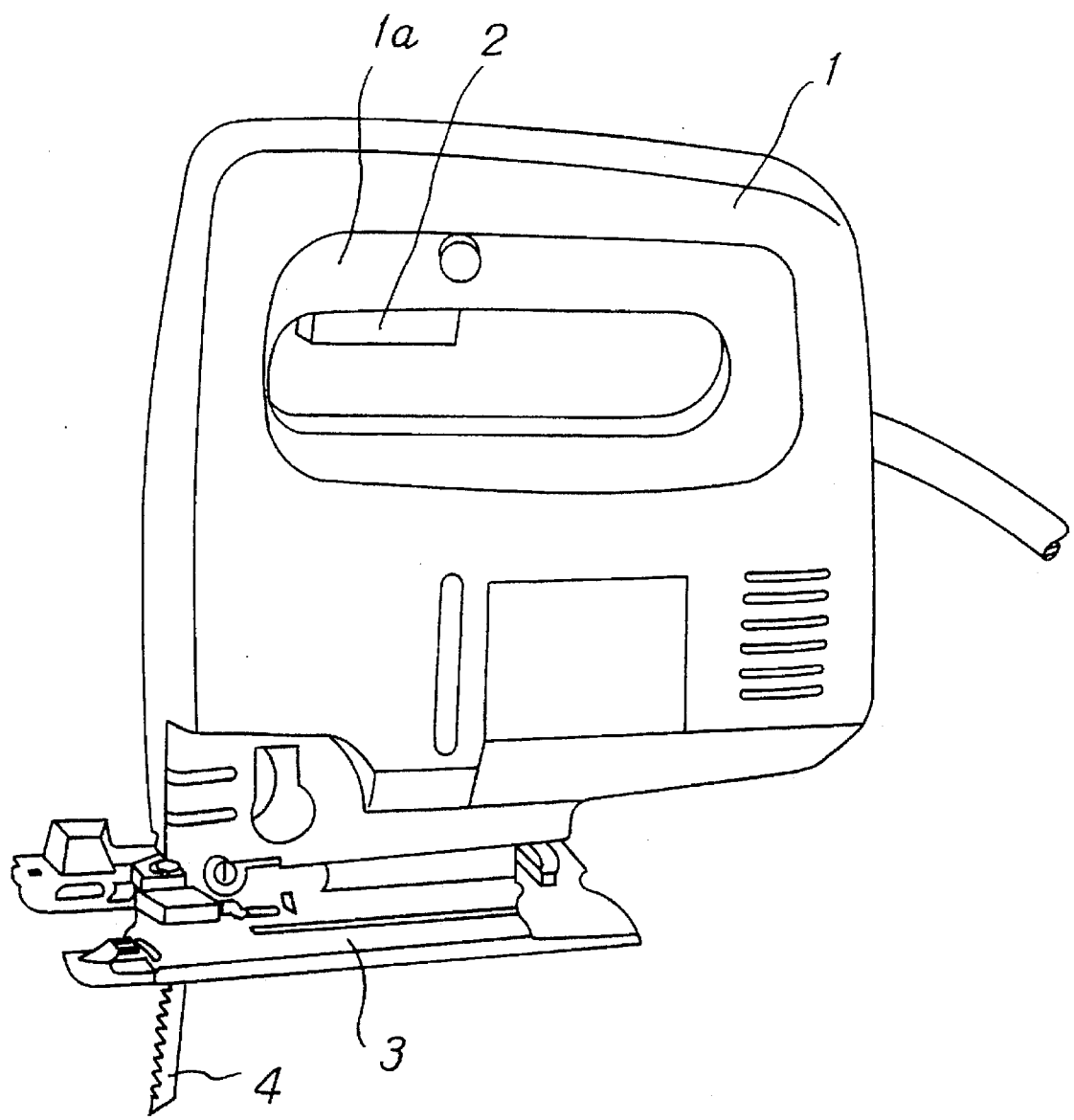
FIG. 1 is a perspective view of a Jigsaw of a cutting tool according to the present invention.

Referring to FIG. 1 showing a perspective view of the cutting tool of the first embodiment, the cutting tool has a main body 1 having a grip portion 1a to which a switch means 2 is mounted. A surface plate 3 is fixed to the main body 1 and a blade 4 is mounted at a portion near the surface plate 3 to be reciprocally movable.

Figure 2:
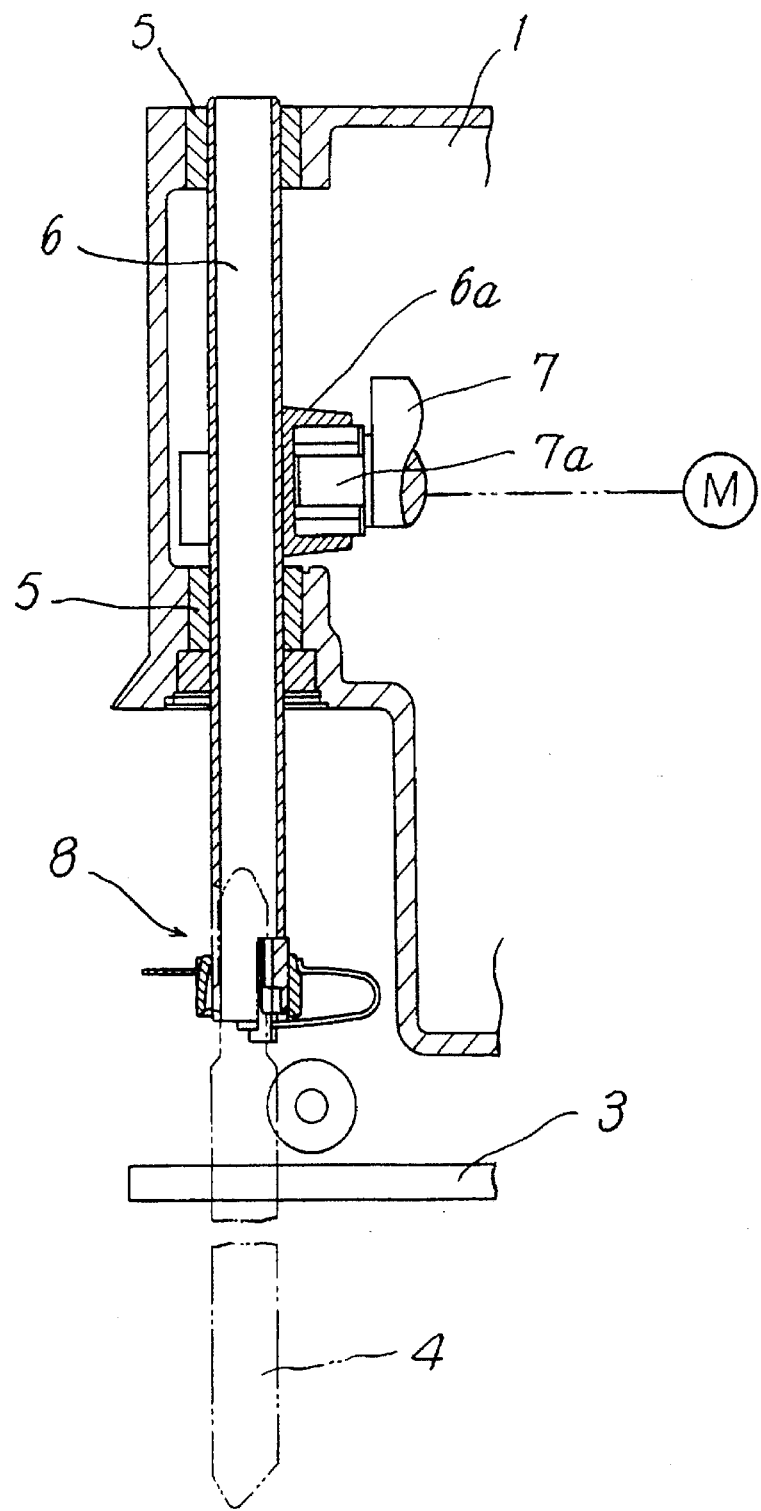
FIG. 2 is an enlarged sectional view of a portion of the jigsaw of FIG. 1.

Referring to FIG. 2, a plunger 6 is mounted to the main body 1 to be movable in its axial direction through bearings 5, 5. A bearing support 6a is attached to the side portion of the plunger 6 and an eccentric portion 7a of a rotational shaft 7 coupled to a driving device M is mounted to be movable. A blade mounting mechanism 8 is attached to the lower portion, as viewed in FIG. 2, of the plunger 6.

Figure 3:
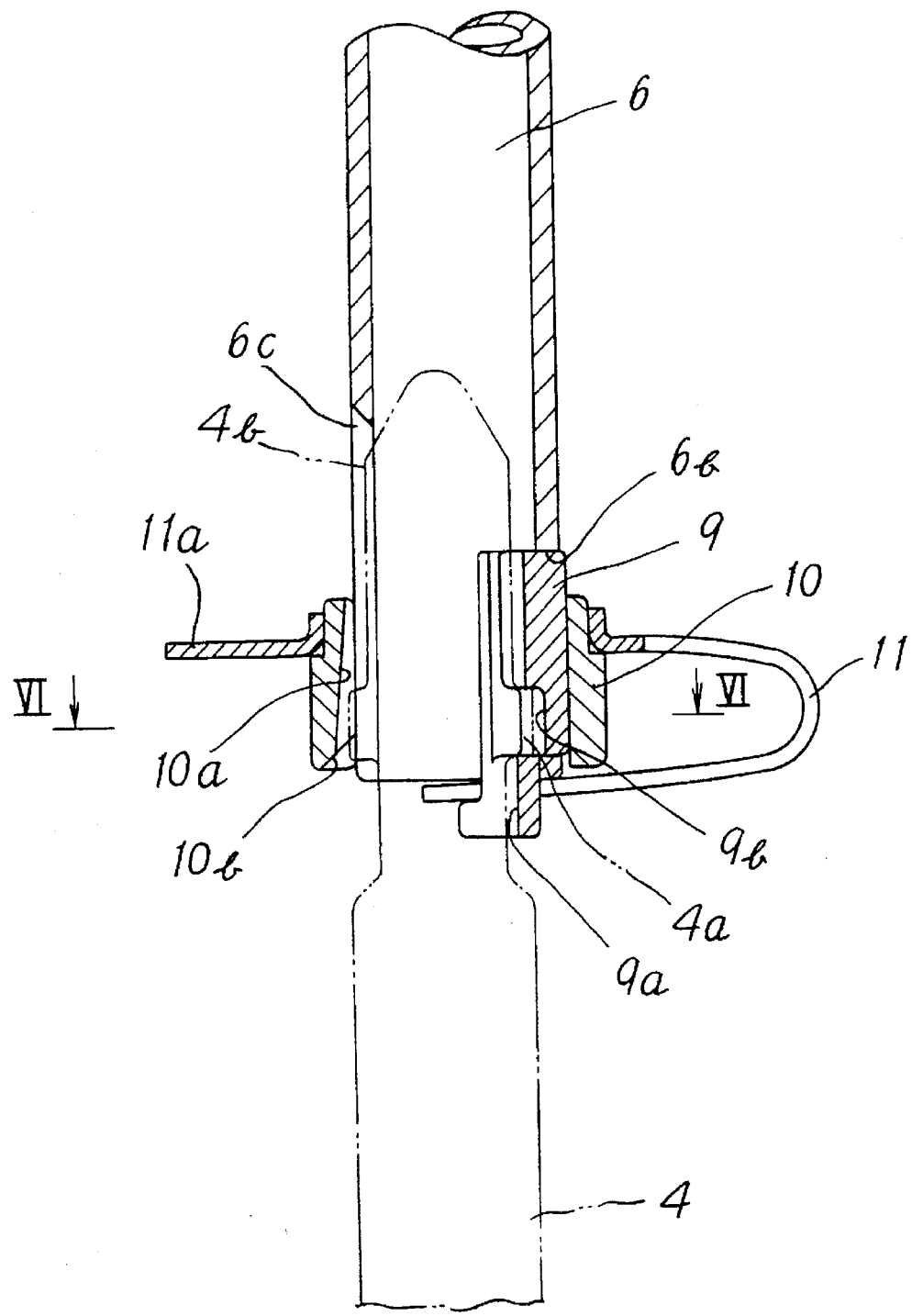
FIG. 3 is an enlarged sectional view of a blade mounting mechanism of the cutting tool of FIG. 1.
Figure 4:
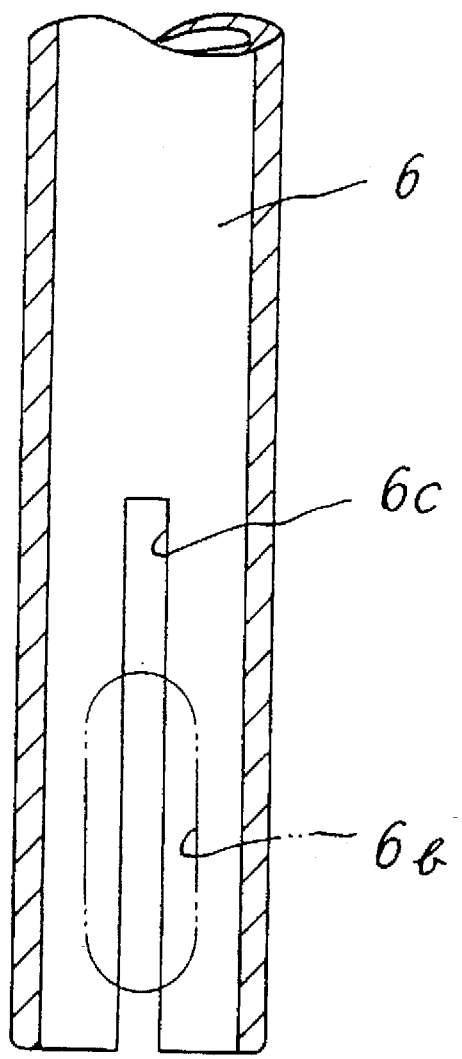
FIG. 4 is a sectional view of a plunger utilized for the cutting tool of FIG. 1.
Figure 5:
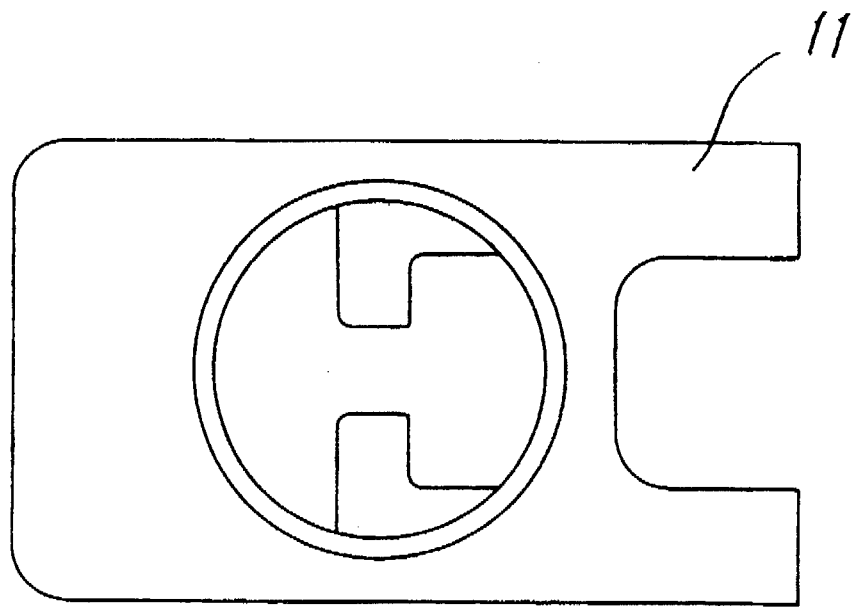
FIG. 5 is a plan view of an elastic member utilized for the cutting tool of FIG. 1.

Referring to FIGS. 3 and 4, showing the blade mounting mechanism 8, the plunger 6 is formed with a hole 6b (opening) into which a support member 9 is inserted. A ring member 10 is provided for the outer peripheral portions of the plunger 6 and the support member 9 to be axially, vertically as viewed, movable, and an elastic member 11 is interposed, as shown in FIG. 5, between the ring member 10 and the support member 9 to thereby always urge the ring member 10 downward.

A cutout 6c is formed to the plunger 6 at a portion opposing to the hole 6b, and a first tapered portion 10a and a second tapered portion 10b continuous to the first tapered portion 10a are formed to the inner peripheral surface of the ring member 10 so as to oppose to the cutout 6c. The first tapered portion 10a has a taper inclination smaller than that of the second tapered portion 10b with respect to the axial direction of the plunger 6 for the purpose of easily and smoothly guiding the insertion of the blade 4.

Figure 6A:
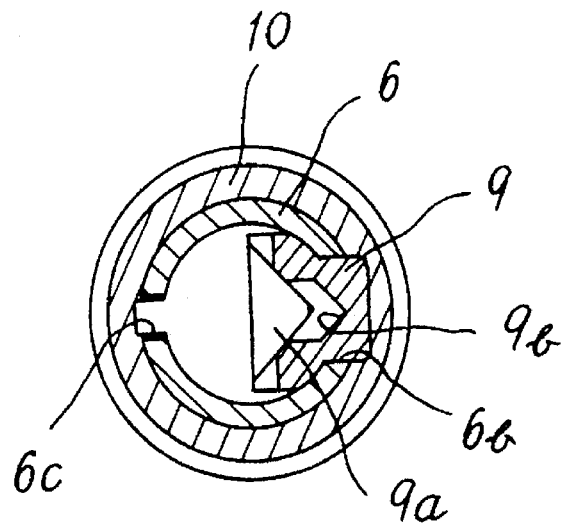
FIG. 6A is a sectional view taken from a line VI—VI in FIG. 3.

As shown in FIG. 3 or 6A, the support member 9 is formed with a groove 9a to which an engaging V-groove 9b, having partial V-section, is continuously formed, and the blade 4 is formed with an engaging protrusion 4a which is engaged with this V-groove 9b, thereby firmly fastening the blade with substantial no deflection thereof.

Figure 6B:
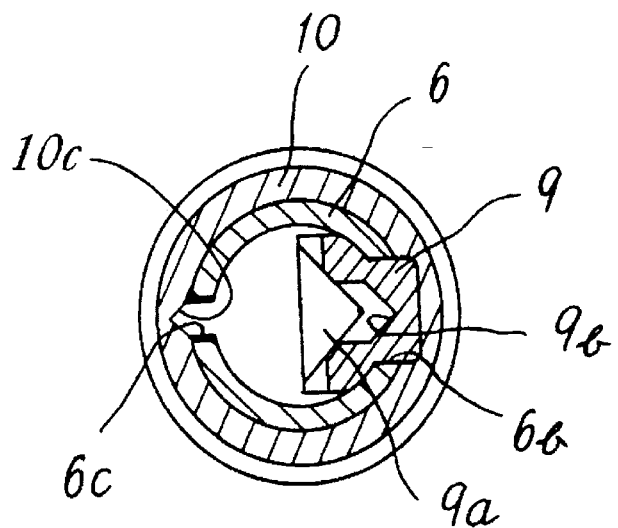
FIG. 6B is a view of a modified version of the embodiment shown in FIG. 6A.

The blade 4 will be firmly fastened by forming a V-groove similar to the V-groove 9b to the first tapered portion 10a of the ring member 10 or it will be further firmly fastened by forming such V-grooves 9b and 10c respectively to both the groove 9a of the support member 9 and the first tapered portion 10a of the ring member 10 as shown in FIG. 6B.

The blade 4 of the cutting tool of the structure described above will be mounted (attached or detached) in the following manner.

First, when the blade 4 is attached, the front end portion 11a of the elastic member 11 is pulled upward as in FIG. 3 against the urging force thereof, and at this time, the ring member 10 is also moved upward together with the elastic member 11. With this state being maintained, the blade 4 is inserted into the plunger 6. In this operation, since the first and second tapered portions 10a and 10b are formed to the ring member 10, the blade 4 can be smoothly inserted into the plunger 6, and the blade 4 can be firmly fastened by a wedge effect through the abutment of the engaging protrusion 4b against the tapered surfaces, thus preventing the blade 4 from deflecting. In the next step, the engaging protrusion 4a formed to the blade 4 is inserted into the engaging V-groove 9b formed to the support member 9, thus firmly fastening the blade 4 and preventing the blade 4 from falling down and deflecting bilaterally. Under this state, when the front end portion 11a of the elastic member 11 is moved downward, as viewed in FIG. 3, by the urging force of the elastic member 11, the ring member 10 is also moved downward, and the engaging protrusion 4b of the blade 4 on the side of the tapered portions 10a and 10b is pressed in the rightward direction by the first tapered portion 10a, whereby the blade 4 can be firmly fastened and supported.

On the other hand, when the blade 4 is detached, the front end portion 11a of the elastic member 11 is moved upward, as viewed in FIG. 3, against the urging force thereof to thereby move up the ring member 10. According to this manner, the fastening force to the blade 4 is released and the blade 4 can be withdrawn through the cutout 6c of the plunger 6, thus the blade 4 being detached.

In the above embodiment, the fastening of the blade 4 is effectively done by utilizing the wedge effect of the tapered portion 10a of the ring member 10 through the abutment of the engaging protrusion 4b against the tapered portion 10a, but in a preferred modification substantially the same effect will be achieved by an arrangement that the engaging protrusion portion 4b of the blade 4 may be abutted against the tapered portion to thereby fasten the blade 4.

Figure 7:
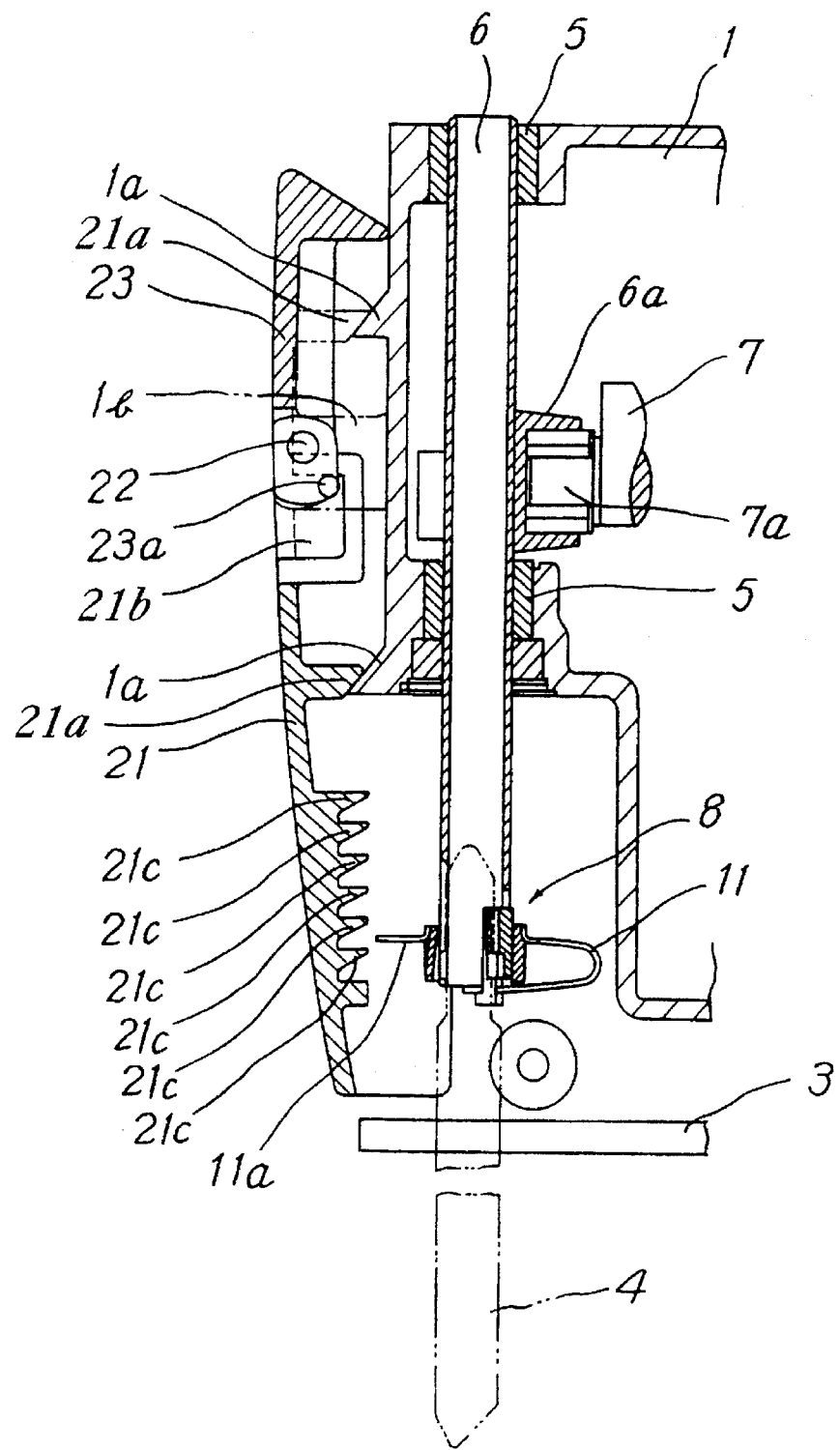
FIG. 7 is an enlarged sectional view taken along the line VII—VII in FIG. 8, of an important portion of a cutting tool according to a second embodiment of the present invention.

FIG. 7 represents a second embodiment of a cutting tool of the present invention, in which like reference numerals are added to elements or members corresponding to those in the first mentioned embodiment.

Figure 8:
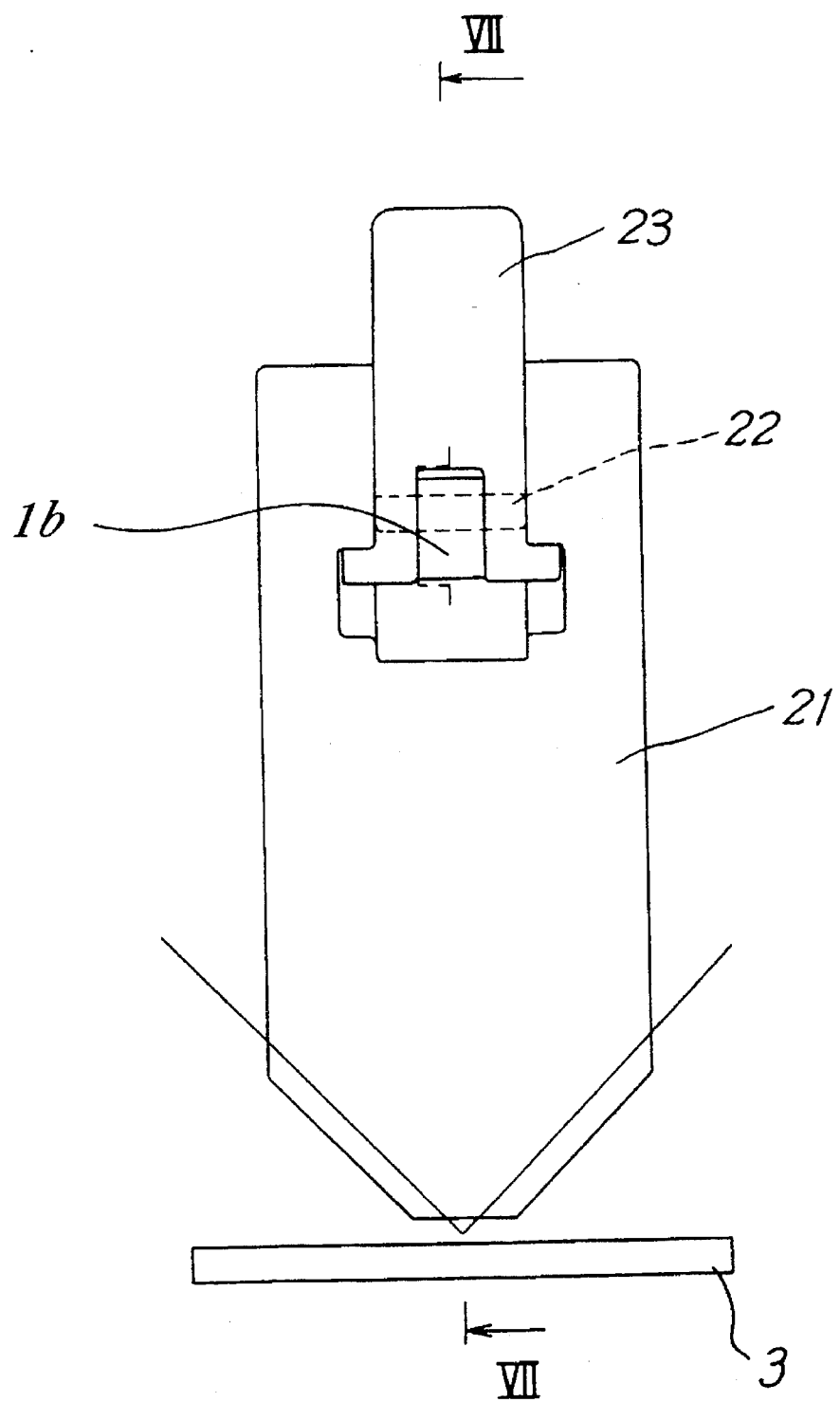
FIG. 8 is a view taken from a left side of FIG. 7.

Referring to FIG. 7, in this embodiment, the main body 1 has a front surface (lefthand surface in FIG. 7) to which two inclining portions 1a, 1a are formed, and a cover 21, to which flanged portions 21a, 21a abutting against and slidable along the inclining portions 1a, 1a are formed, is disposed to be movable along the inclining surface of the inclining portion 1a. A flanged portion 1b is also formed to the front surface of the main body 1 in a projecting manner, and a lever 23 is rotatably supported by a pin 22 extending through the flanged portion 1b, allowing the lever 23 to pivot about the pin 22, as shown in FIG. 8. The lever 23 has one end at which a projection 23a is formed, and this projection 23a is fitted to a recessed portion 21b formed to the cover 21. A plurality of claws 21c, 21c, - - - 21c are formed to the inside surface (righthand surface in FIG. 7) of the cover 21.

The blade 4 of the cutting tool of this embodiment will be attached or detached in the following manner.

The blade 4 of the cutting tool of this second embodiment will be attached or detached (mounted or dismounted) in the following manner.

Figure 9:
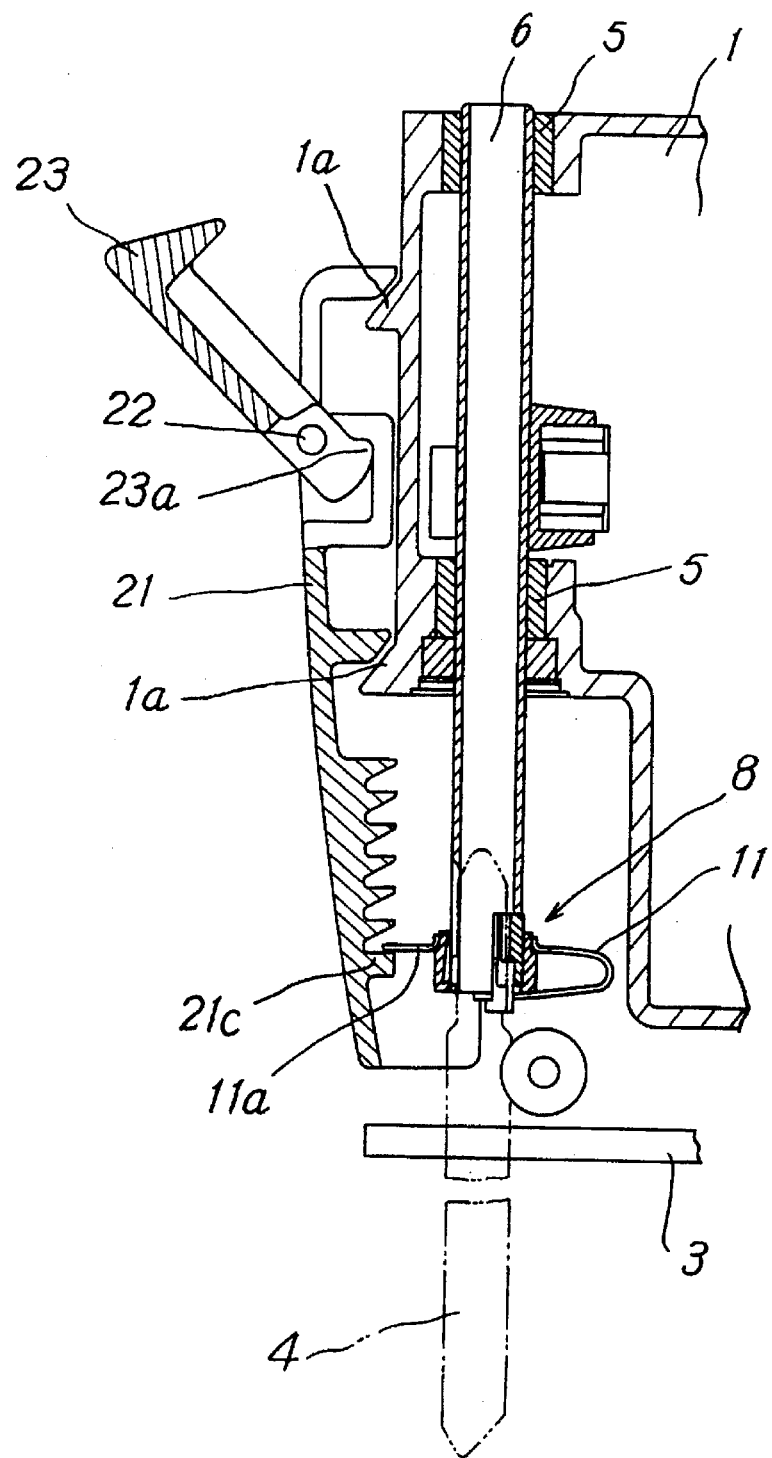
FIGS. 9 and 10 are enlarged sectional views of the important portion of the cutting tool of the second embodiment of FIG. 7 for the explanatory of an operation of the second embodiment.
Figure 10:
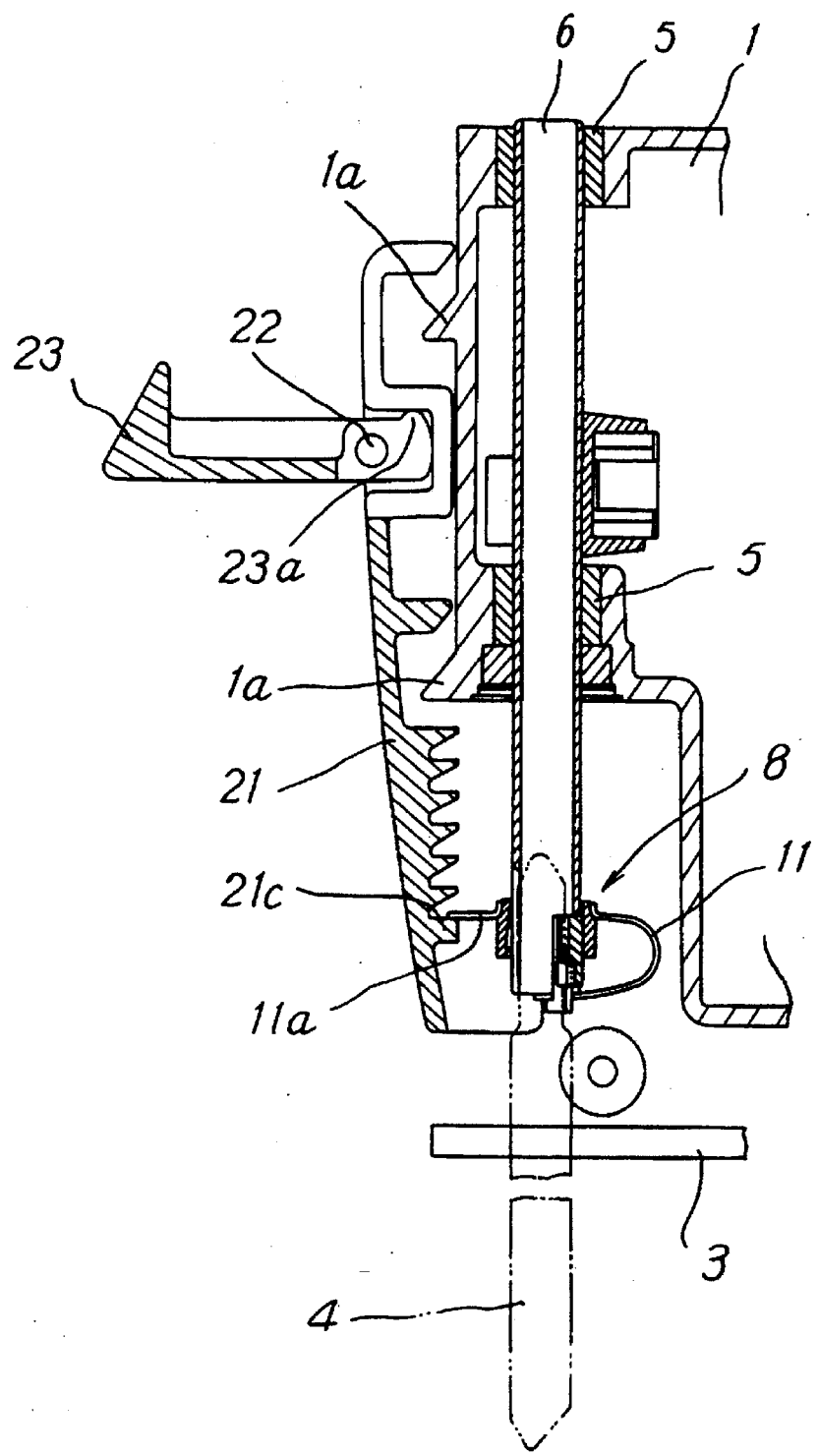
Figure 11:
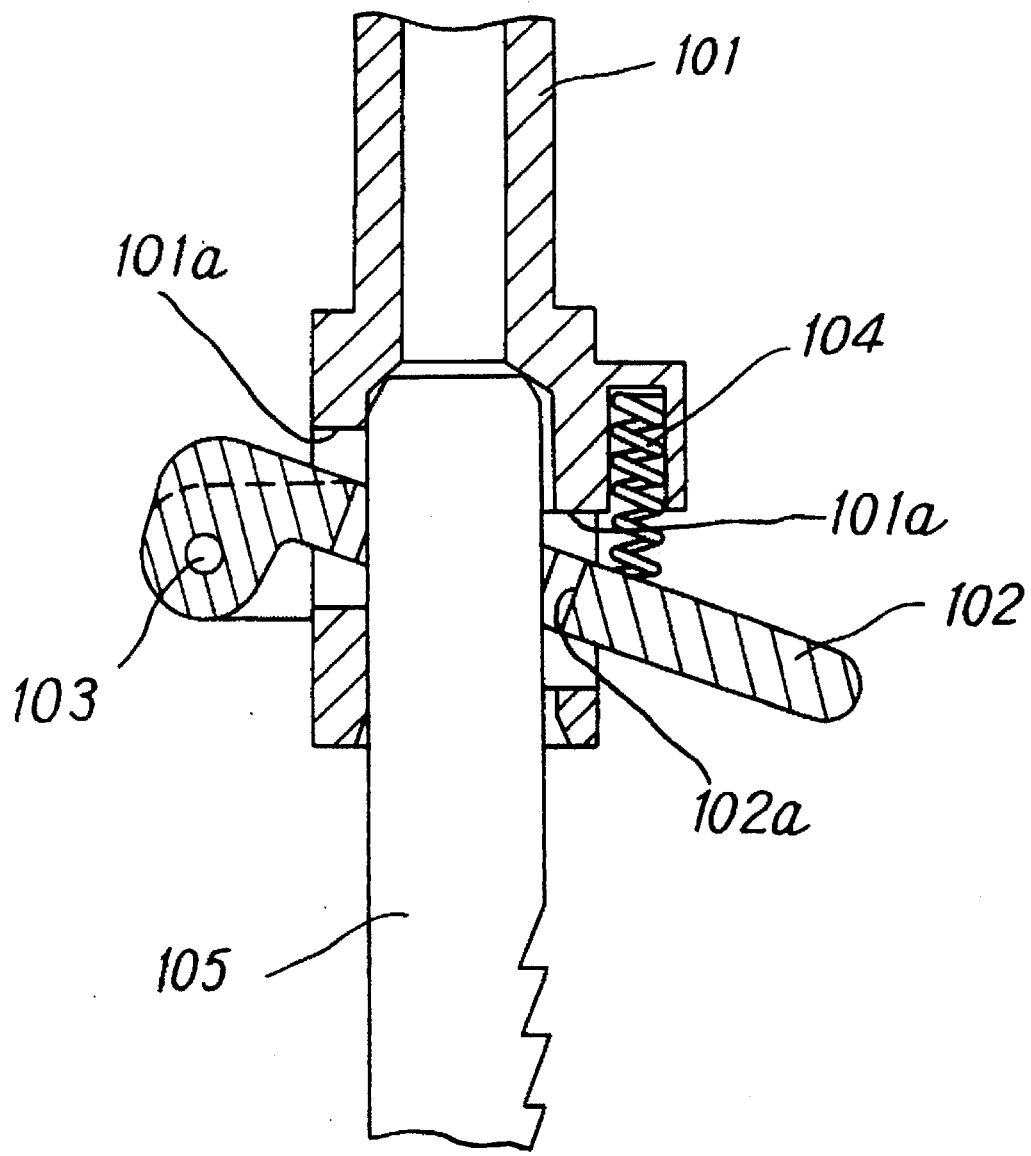
FIG. 11 is an enlarged sectional view of a blade mounting mechanism of a cutting tool of a conventional structure.

To mount the blade 4, the lever 23 is rotated about the pin 22 being the center of the rotation in the counterclockwise direction in FIG. 7. Then, the cover 21 is moved in the right upward direction, as viewed, by the projection 23a and one of the claws 21c of the cover 21 abuts against the front end portion 11a of the elastic member 11 as shown in FIG. 9. When the lever 23 is further rotated, the cover 21 is moved further in the right upward direction and the front end portion 11a of the elastic member 11 is lifted upward by the claw 21c against the urging force of the elastic member 11. At the same time, the ring member 10 is also moved upward together with the elastic member 11 as shown in FIG. 10. Under this condition, the blade 4 is mounted in substantially the same manner as that mentioned before with respect to the first embodiment with reference to FIG. 3, and the lever 23 is rotated in the clockwise direction about the pin 22, thereby moving the cover in the left downward direction, as viewed, and separating the claw 21c from the front end portion 11a of the elastic member 11. In thus manner, the blade 4 can be firmly fastened.

In this embodiment, the claw 21c can surely abut against the front end portion 11a by locating a plurality of claws 21c even if the plunger 6 stops at any position.

In the described embodiment, the blade 4 is constructed so that the engaging protrusion 4a of the blade 4 abuts against the first tapered portion 10a of the ring member 10, but in a modification, the end portion 4c of the blade 4 may be constituted so as to abut against the first tapered portion 10a. Furthermore, in the described embodiment, the engaging protrusion 4a of the blade 4 is inserted into the engaging V-Groove 9b of the support member 9, but in a modification, the engaging protrusion 4a may be engaged with the hole 6b of the plunger 6.

Although the present invention was described hereinbefore with respect to a jigsaw, it will be applicable to a recipro-saw as a cutting tool without any specific difficulty.

According to the embodiments and modifications of the present invention, since the ring member is moved by the urging force of the elastic member under the condition that the engaging protrusion of the blade is engaged with the engaging groove of the support member when the blade is mounted to the cutting tool body, no specific means is required for firmly mounting and fastening the blade to the body. Furthermore, the blade can be strongly fastened to the tool body by the wedge effect through the abutment of the engaging protrusion of the blade against the tapered portion of the ring member, thereby preventing the blade from deflecting. In addition, the fall-out and the bilateral deflection of the blade can be also prevented by the insertion of the engaging protrusion of the blade into the V-groove of the support member, thus improving the working efficiency and performance.

What is claimed is:

1. A cutting tool comprising:
 a main body;
 a plunger provided for the main body to be reciprocally movable in an axial direction thereof, said plunger being provided with an opening and a cutout axially formed to a portion opposing to the opening;
 a drive means accommodated in the main body for driving the plunger;
 a cutting blade to be mounted to the plunger; and
 a blade mounting mechanism for mounting the blade to the plunger,
 said blade mounting mechanism comprising a support member inserted into said opening of the plunger and provided with an engaging groove formed along a direction of mounting the blade, a ring member disposed to outer peripheral surfaces of the support member and the plunger, said ring member being formed with a tapered portion at an inner peripheral surface thereof opposing to said cutout of the plunger, and an elastic member for urging the ring member in a direction that a diameter of the tapered portion of the ring member reduces, thereby fastening the blade by the tapered portion of the ring member and the engaging groove of the support member.

2. A cutting tool according to claim 1, wherein said elastic member is held on the outer circumferiential surface of the ring member so as to always urge the ring member downward in an installed condition.

3. A cutting tool according to claim 1, wherein said tapered portion of the ring member has a first tapered section having a predetermined inclination and a second tapered section having an inclination different from that of the first tapered section.

4. A cutting tool according to claim 3, wherein the inclination of said second tapered section is larger than that of the first tapered section for smooth insertion of the blade.

5. A cutting tool according to claim 1, wherein said blade is formed with an engaging protrusion and said support member has a V-shaped groove communicating with the engaging groove of the support member so as to engage with the engaging protrusion of the blade.

6. A cutting tool according to claim 5, wherein said blade is formed with another, oppositely extending, engaging protrusion and said ring member is formed with a V-shaped groove so as to engage with the oppositely extending engaging protrusion of the blade.

7. A cutting tool according to claim 1, wherein said claw means comprises a plurality of claws.

8. A cutting tool according to claim 1, further comprising a blade cover mounted to the main body to be movable, a lever member attached to the main body to be rotatable and engaged with the blade cover to move the blade cover and a claw means formed to the blade cover adapted to contact or separate from the elastic member, wherein when the blade cover is moved through rotation of the lever member, the claw means abuts against a front end portion of the elastic member, which is then moved against an urging force provided by the elastic member.

9. A cutting tool according to claim 1, wherein said blade is formed with an engaging protrusion and said ring member has a V-shaped groove so as to engage with the engaging protrusion of the blade.

10. A cutting tool comprising:
 a main body;
 a plunger provided for the main body to be reciprocally movable in an axial direction thereof, said plunger being provided with an opening and a cutout axially formed to a portion opposing to the opening;
 a drive means accommodated in the main body for driving the plunger;
 a cutting blade to be mounted to the plunger;
 a blade mounting mechanism for mounting the blade to the plunger; and
 a lever member attached to the main body to be rotatable and engaged with the blade cover to move the blade cover;
 said blade mounting mechanism comprising a support member inserted into said opening of the plunger and provided with an engaging groove formed along a direction of mounting the blade, a ring member disposed to outer peripheral surfaces of the support member and the plunger, said ring member being formed with a tapered portion at an inner peripheral surface thereof opposing to said cutout of the plunger, and an elastic member for urging the ring member in a direction that a diameter of the tapered portion of the ring member reduces, thereby fastening the blade by the tapered portion of the ring member and the engaging groove of the support member;

the cutting tool further comprising a claw means formed to the blade cover adapted to contact or separate from the elastic member;

wherein when the blade cover is moved through rotation of the lever member, the claw means abuts against a front end portion of the elastic member, which is then moved against an urging force provided by the elastic member.

11. A cutting tool according to claim 10, wherein said elastic member is held on the outer circumferiential surface of the ring member so as to always urge the ring member downward in an installed condition.

12. A cutting tool according to claim 10, wherein said tapered portion of the ring member has a first tapered section having a predetermined inclination and a second tapered section having an inclination different from that of the first tapered section.

13. A cutting tool according to claim 12, wherein the inclination of said second tapered section is larger than that of the first tapered section for smooth insertion of the blade.

14. A cutting tool according to claim 10, wherein said blade is formed with an engaging protrusion and said support member has a V-shaped groove communicating with the engaging groove of the support member so as to engage with the engaging protrusion of the blade.

15. A cutting tool according to claim 14, wherein said blade is formed with another, oppositely extending, engaging protrusion and said ring member is formed with a V-shaped groove so as to engage with the oppositely extending engaging protrusion of the blade.

16. A cutting tool according to claim 10, wherein said claw means comprises a plurality of claws.

17. A cutting tool according to claim 10, wherein said blade is formed with an engaging protrusion and said ring member has a V-shaped groove so as to engage with the engaging protrusion of the blade.

* * * * *